United States Patent
Yasuda et al.

(10) Patent No.: US 7,703,322 B2
(45) Date of Patent: Apr. 27, 2010

(54) LIQUID LEVEL DETECTING DEVICE AND METHOD OF MANUFACTURING SAME

(75) Inventors: Atsushi Yasuda, Anjo (JP); Isao Miyagawa, Kariya (JP)

(73) Assignee: Denso Corporation, Kariya (JP)

( * ) Notice: Subject to any disclaimer, the term of this patent is extended or adjusted under 35 U.S.C. 154(b) by 524 days.

(21) Appl. No.: 11/584,787

(22) Filed: Oct. 23, 2006

(65) Prior Publication Data
US 2007/0090832 A1 Apr. 26, 2007

(30) Foreign Application Priority Data

| Oct. 21, 2005 | (JP) | ............................. 2005-307530 |
| Dec. 7, 2005 | (JP) | ............................. 2005-353885 |
| Jun. 6, 2006 | (JP) | ............................. 2006-157831 |
| Jul. 27, 2006 | (JP) | ............................. 2006-205306 |
| Aug. 7, 2006 | (JP) | ............................. 2006-214928 |

(51) Int. Cl.
*G01F 23/00* (2006.01)
(52) U.S. Cl. .......................................... 73/313; 73/317
(58) Field of Classification Search .................... 73/313
See application file for complete search history.

(56) References Cited

U.S. PATENT DOCUMENTS

| 6,118,361 | A | 9/2000 | Ogawa |  |
| 6,401,533 | B1* | 6/2002 | Gier et al. ...................... | 73/313 |
| 6,564,632 | B2* | 5/2003 | Ross, Jr. ...................... | 73/317 |
| 6,578,417 | B1* | 6/2003 | Eck ............................. | 73/305 |
| 6,679,116 | B2* | 1/2004 | Ross, Jr. ...................... | 73/317 |
| 6,762,679 | B1* | 7/2004 | Diaz ........................... | 340/524 |
| 6,976,394 | B2* | 12/2005 | Kleinen et al. ................. | 73/313 |
| 6,993,968 | B2* | 2/2006 | Kogure ........................ | 73/317 |
| 7,093,485 | B2* | 8/2006 | Newman et al. .............. | 73/317 |
| 7,201,052 | B2* | 4/2007 | Lee ............................. | 73/317 |
| 7,377,163 | B2* | 5/2008 | Miyagawa .................... | 73/317 |
| 2004/0163467 | A1 | 8/2004 | Tanaka et al. |  |
| 2005/0083045 | A1 | 4/2005 | Miyagawa |  |

FOREIGN PATENT DOCUMENTS

| DE | 199 27 741 | 12/1999 |
| DE | 101 42 618 | 3/2003 |
| JP | 2004-152546 | 5/2004 |

OTHER PUBLICATIONS

English Translation of the German Office Action dated Nov. 18, 2008 for corresponding DE Application No. 10 2006 049 391.5-52.

* cited by examiner

*Primary Examiner*—Hezron Williams
*Assistant Examiner*—Rodney T Frank
(74) *Attorney, Agent, or Firm*—Nixon & Vanderhye PC

(57) ABSTRACT

A liquid level detecting device for detecting liquid level contained in a tank includes a float and an arm that moves in a prescribed manner when liquid level changes, a permanent magnet for forming a magnetic field, a hall IC for generating an electric signal in response to the motion of the magnetic field, a rotary member linked with the arm and the permanent magnet for moving the magnetic field relative to the hall IC as the float and the arm move, a terminal member for connecting the hall IC to an outside control circuit; and a mold body including a resinous holder for holding the hall IC and the terminal member. The resinous holder includes a sheath for insulating the hall IC from heat and mechanical stress generated when the mold body is formed.

22 Claims, 16 Drawing Sheets

LIQUID LEVEL DETECTING DEVICE AND METHOD OF MANUFACTURING SAME

CROSS REFERENCE TO RELATED APPLICATION

The present application is based on and claims priority from Japanese Patent Applications: 2005-307530, filed Oct. 21, 2005; 2005-353885, filed Dec. 7, 2005; 2006-157831, filed Jun. 6, 2006; 2006-205306, filed Jul. 27, 2006; and 2006-214928, filed Aug. 7, 2006, the contents of which are incorporated herein by reference.

BACKGROUND OF THE INVENTION

1. Field of the Invention

The present invention relates to a liquid level detecting device that detects the level of liquid contained in a tank and a method of manufacturing such a liquid level detecting device. In particular, the present invention relates to a fuel level gauge for detecting the level of fuel contained in a fuel tank of a vehicle.

2. Description of the Related Art

Such a liquid level detecting device usually equipped with a magnetic sensor to detect the level of liquid contained in a tank. The liquid level detecting device includes a body, a float, a rotary member rotatable with respect to the body, an arm that is linked with the float and the rotary member to convert a vertical motion into a rotating motion, a permanent magnet mounted on the rotary member and a magnetic sensor, as disclosed in JP-A-2004-251780, its counterpart US 2004/0163467 A1, JP-A-2004-152546, JP-A-2005-10047 or its counterpart US 2005/0083045 A1.

The magnetic sensor is mounted in the body to detect magnetic flux density of the magnetic field that is formed by the permanent magnet. The body includes electric terminals that connect the magnetic sensor with an outside unit and various electric parts such as lead wires, capacitors and resistors. The electric terminals and the electric parts are insert-molded into a resinous member to protect them from vibration and other environmental hazards.

However, it is difficult to reduce the size of the above liquid level detecting device because of using the lead wires and common type capacitors and resistors. Although chip capacitors and chip resistors are effective to reduce the size of the device, it is difficult to mount in the device without mechanical damage because of a high molding pressure applied to the chip capacitors.

SUMMARY OF THE INVENTION

Therefore, an object of the invention is to provide a compact liquid level detecting device.

According to a feature of the invention, a liquid level detecting device for detecting liquid level contained in a tank includes a first member moving in a prescribed manner when liquid level changes, field means for forming a magnetic field, an electronic circuit for generating an electric signal in response to motion of the magnetic field, a second member linked with the first member and the field means for moving the magnetic field relative to the electronic circuit as the first member moves, a terminal member for connecting the electric circuit to an outside control circuit; and a mold body including a resinous holder for holding the electric circuit and the terminal member, wherein the resinous holder includes a case for insulating the electronic circuit from heat and mechanical stress when the mold body is formed.

In the above liquid level detecting device, the first member may include a float disposed in liquid and an arm that links the float with the second member. In this case: the field means may include a permanent magnet; the second member may include a rotary member that carries the permanent magnet; and the mold body may include a hollow shaft for rotatably supporting the rotary member at its outer periphery and accommodating the case inside thereof.

In the above liquid level detecting device: the electronic circuit may be a hall IC; and the electronic circuit may further include a chip capacitor connected to the terminal member to protect the electronic circuit from electric noises. In this case: the terminal member may include at least a first terminal, a second terminal and a pair of chip mounts for mounting the chip capacitor to be connected across the first terminal and the second terminal; and the terminal member, the chip capacitor and the electronic circuit may be integrated into the resinous holder to form a detecting unit that is covered with resinous material to form the mold body. In this case: the detecting unit may include a protecting cover that covers the chip capacitor; and the resinous holder may also have a dented portion in which the chip capacitor is disposed and fixed to the terminal member.

In the above liquid level detecting device: the resinous holder may have a base portion for protecting the terminal member from molding pressure when the mold body is formed in a molding die; an adhesive agent may be disposed between the resinous holder and the chip capacitor; and a resinous material may be filled in the dented portion.

In the above liquid level detecting device: the case may include a sheath that extends perpendicular to the terminal member; the terminal member may have an adhesive coating at a portion in contact with the resinous holder, and the resinous holder may have a ring-shaped projection at a portion thereof surrounding the terminal member. In this case: the resinous holder may have a dented portion at a side of the sheath behind the electronic circuit to be supported by a pin projecting from a die when the detecting unit is molded into the mold body by a molding die; the resinous holder may have a projecting portion from a side of the sheath behind the electronic circuit to be supported by a molding die when the detecting unit is molded into the mold body by the molding die.

Another object of the invention is to provide an improved method of manufacturing a compact liquid level detecting device without damage.

According to another feature of the invention, a method of manufacturing the above constructed liquid level detecting device includes the steps of molding the terminal member with resinous material to form an integrated unit of the resinous holder having the case and the terminal member, electrically connecting a chip element to the terminal member so that the chip element can be supported by the terminal member, thereby forming a detecting unit, and molding the detecting unit with resinous material to form the mold body.

In the above method: a step of filling resinous material between the chip element and the resinous holder is added before the step of molding the detecting unit; the step of molding the terminal member may further include a step of forming a dented portion for exposing the terminal member so as to connect the chip element to the terminal member; the step of molding the terminal member may further include a step of forming a base portion behind the dented portion so that the resinous holder can be supported by a mold die at the base portion in the step of molding the detecting unit; a step of covering adhesive agent at a portion of the terminal member in contact with the resinous holder may be added before the step of molding the terminal member; a step of inserting the electronic circuit into the case may be added before the step of electrically connecting.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Some preferred embodiments according to the present invention will be described with reference to the appended drawings.

A liquid level detecting device according to the first embodiment of the invention will be described with reference to FIGS. 1-15.

Figure 1:
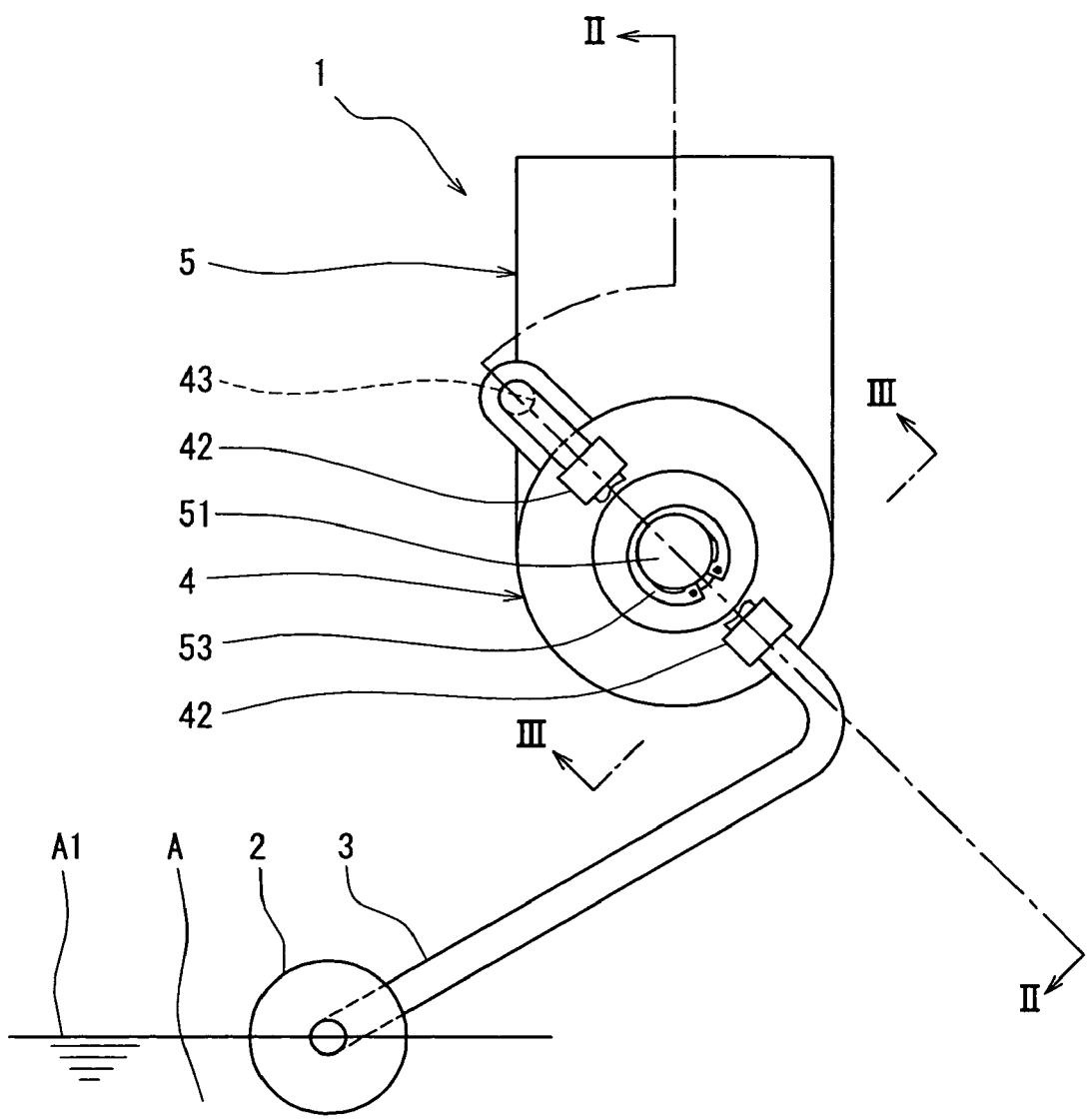
FIG. 1 is a schematic diagram illustrating a liquid level detecting device according to the first embodiment of the invention.
Figure 2:
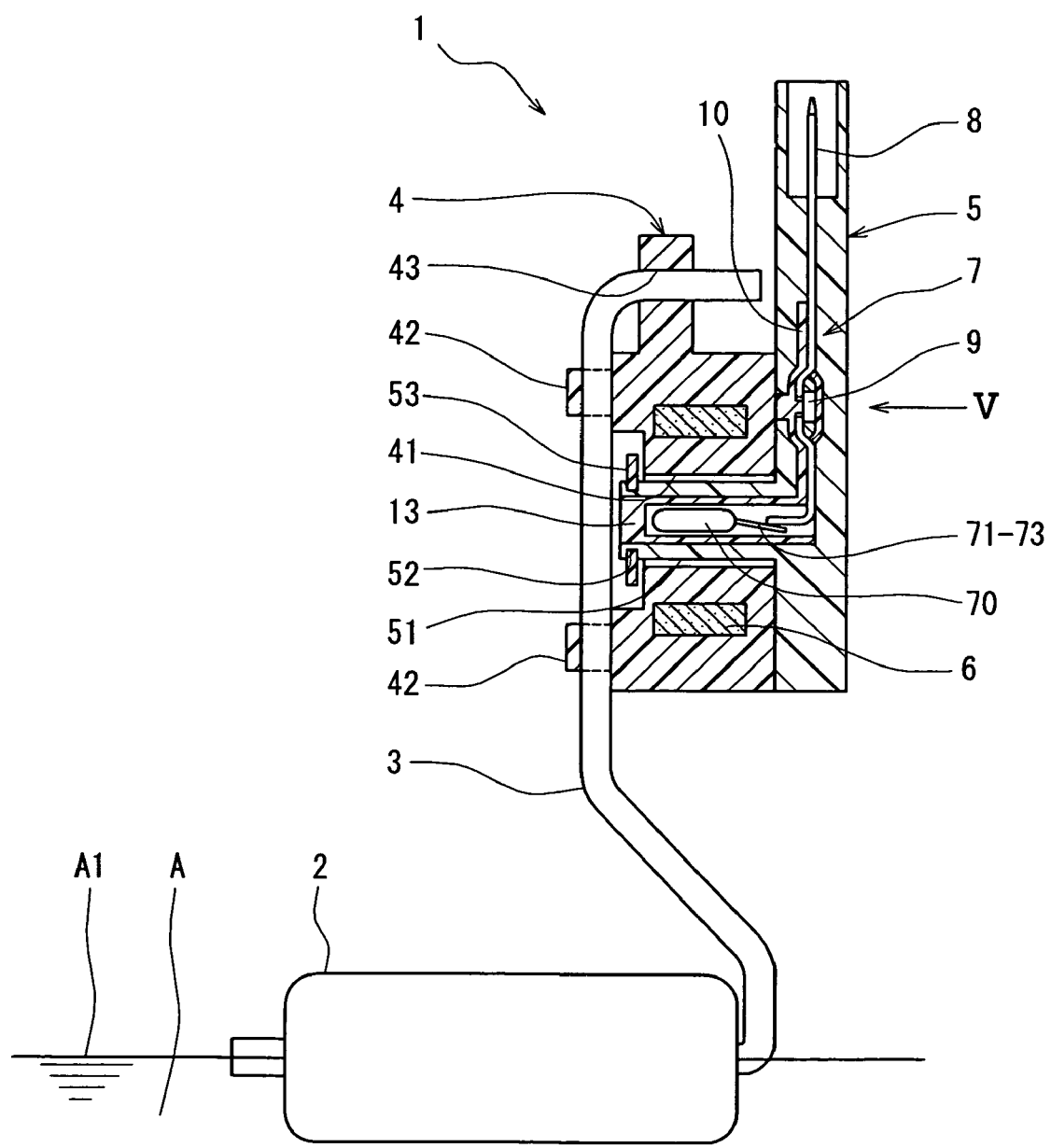
FIG. 2 is a cross-sectional view of the liquid level detecting device shown in FIG. 1 cut along line II-II.
Figure 3:
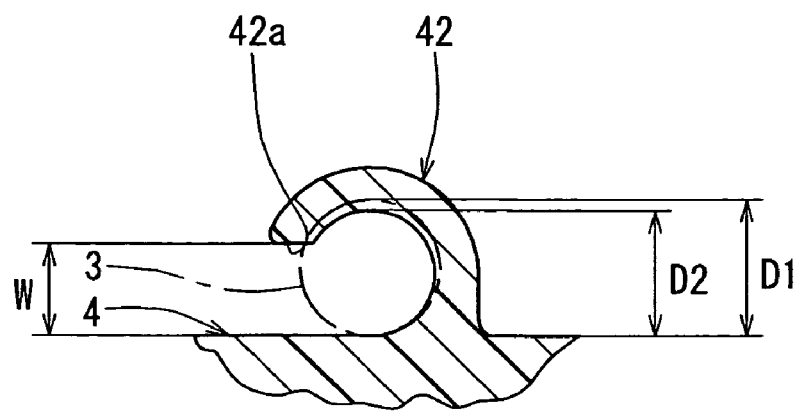
FIG. 3 is a cross-sectional view of the liquid level detecting device shown in FIG. 1 cut along line III-III.

As shown in FIGS. 1 and 2, the liquid level detecting device according to the first embodiment of the invention is used as a fuel level gauge 1 that is fixed to a fuel tank to detect the level A1 of fuel A. The fuel level gauge 1 includes a float 2, an arm 3, a rotary member 4, a body 5, a permanent magnet 6, a detecting unit 7, etc.

The float 2 is made of a resinous member whose specific gravity is arranged to float on the fuel. The arm 3 is made of a metal (e.g. stainless steel) rod whose outside diameter is D1 and connected between the float 2 and the rotary member 4. As the level of the fuel moves up or down, the float 2 with an end of the arm 3 moves up and down. Accordingly, the other end of the arm 3 rotates the rotary member 4.

The rotary member 4 has a cylindrical inner wall 41, which rotatably receives a hollow shaft 51 of the body 5, a pair of holder members 42, which supports a portion of the arm 3, and a through hole 43, which receives an end of the arm 3. A ring-shaped groove 52 is formed on the periphery of the shaft 51 to carry a circlip or snap ring 53, thereby fixing the rotary member 4 to the shaft 51 of the body 5.

The holder members 42 are formed on a surface of the rotary member 4 behind the body 5. The holder members 42 have a semi-cylindrical inside wall whose inside diameter D2 is a little smaller than the outside diameter of the arm 3 and a mouth 42a whose width W is smaller than inside diameter D2. The holder members 42 are formed so that the center axis of the hole defined by the semi-cylindrical inside wall thereof can be aligned with each other. The through hole 43 is formed to be parallel to the cylindrical inside wall 41 of the rotary member 4. The inside diameter of the through hole 43 is equal to or a little smaller than the outside diameter of the arm 3. The center axis of the through hole 43 extends to cross the center axis of the hole defined by the semi-cylindrical inside wall of the holder member 42.

Figure 7:
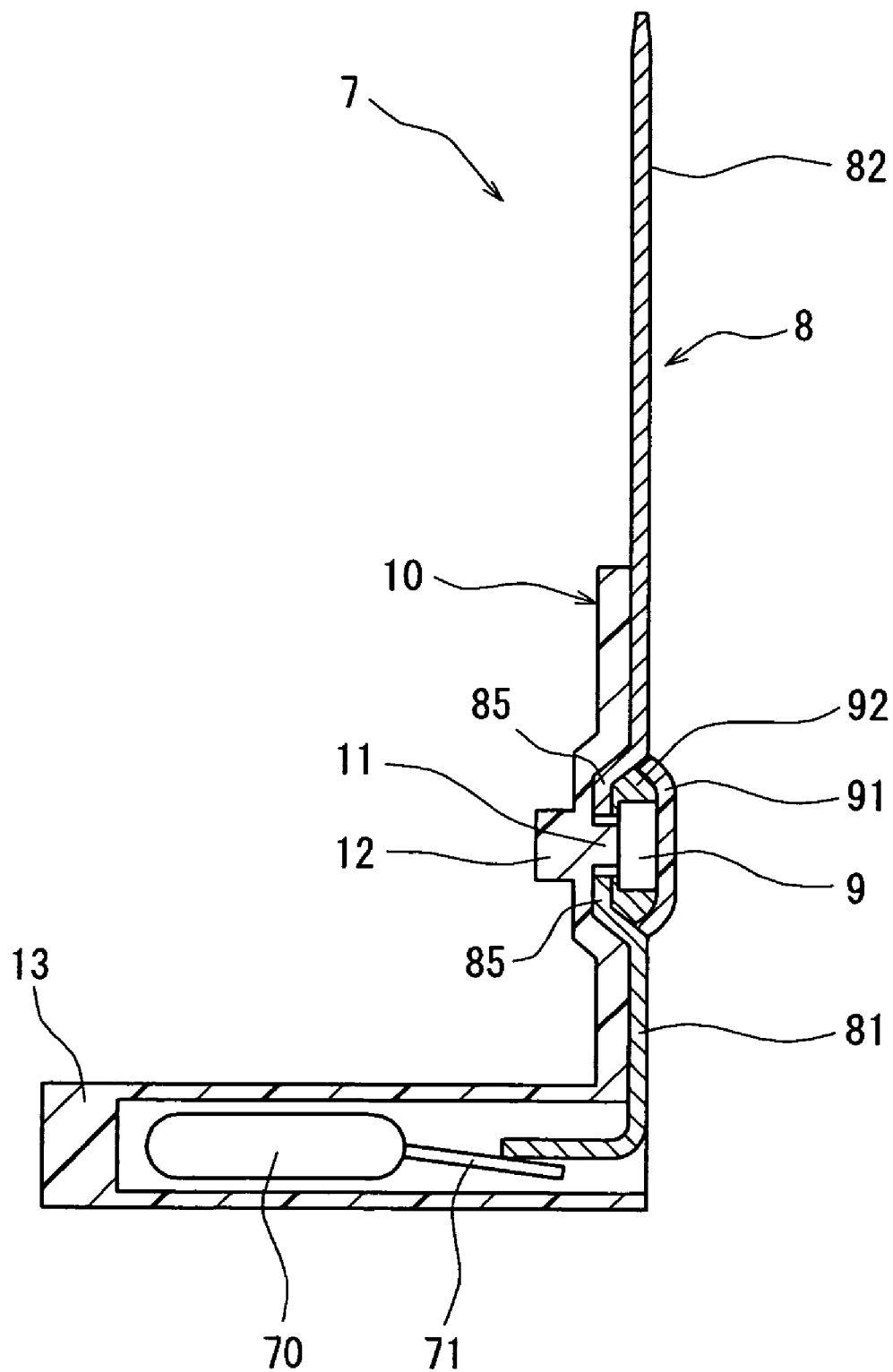
FIG. 7 is a cross-sectional longitudinal view of a detecting unit shown in FIG. 2.

The body 5 includes the detecting unit 7, as shown in FIG. 7.

Figure 4:
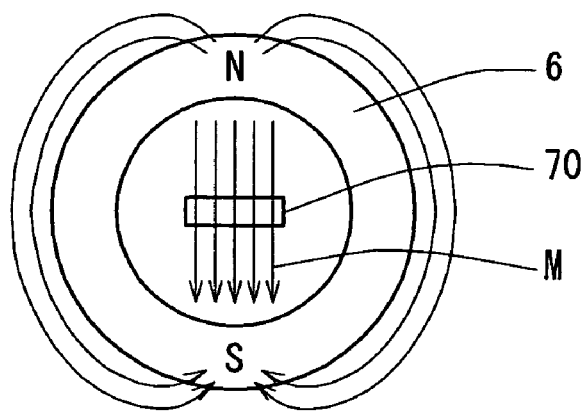
FIG. 4 is a schematic diagram illustrating magnetic flux distribution around a permanent magnet shown in FIG. 2.

The permanent magnet 6 is a cylindrical ferrite-made permanent magnet disposed inside the rotary member 4 to be coaxial with the hole defied by the inside wall 41 of the rotary member 4. As shown in FIG. 4, the permanent magnet 6 is magnetized and polarized so that the magnetic flux thereof flows in a radial direction of the inside wall 41. The permanent magnet 6 is insert-molded in the resinous portion of the rotary member 4, which also includes the holder members 42.

Figure 9:
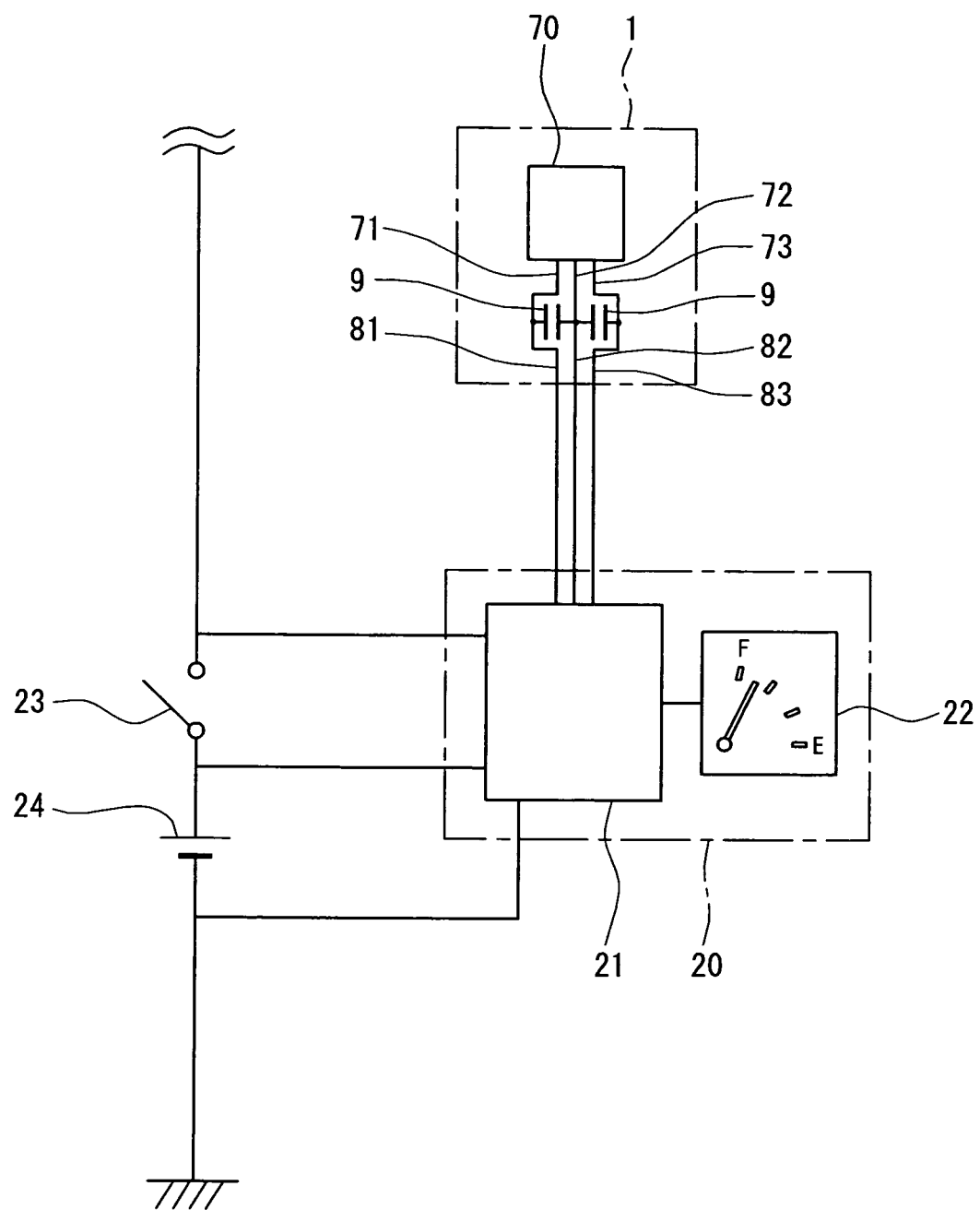
FIG. 9 is a circuit diagram of a fuel level gauge connected with a combination meter.

The detecting unit 7 is comprised of a hall IC 70, a terminal member 8 that connects the hall IC 70 with an outside unit, a pair of chip capacitors 9 and a chip holder 10 that has a sheath 13 for holding the hall IC 70 therein. The sheath 13 extends perpendicular to the terminal member 8 and is disposed inside the hollow shaft 51, so that the hall IC 70 is positioned in the magnetic flux M of the permanent magnet 6. The hall IC 70 includes signal, ground and power leads 71-73, a hall element and an amplifying circuit. The hall IC 70 provides a hall voltage signal that is proportional to the magnetic flux density at its signal lead 71 when it is given a magnetic field. The hall voltage signal is amplified by the amplifying circuit before it is transmitted to a control circuit 21 (FIG. 9).

Figure 5:
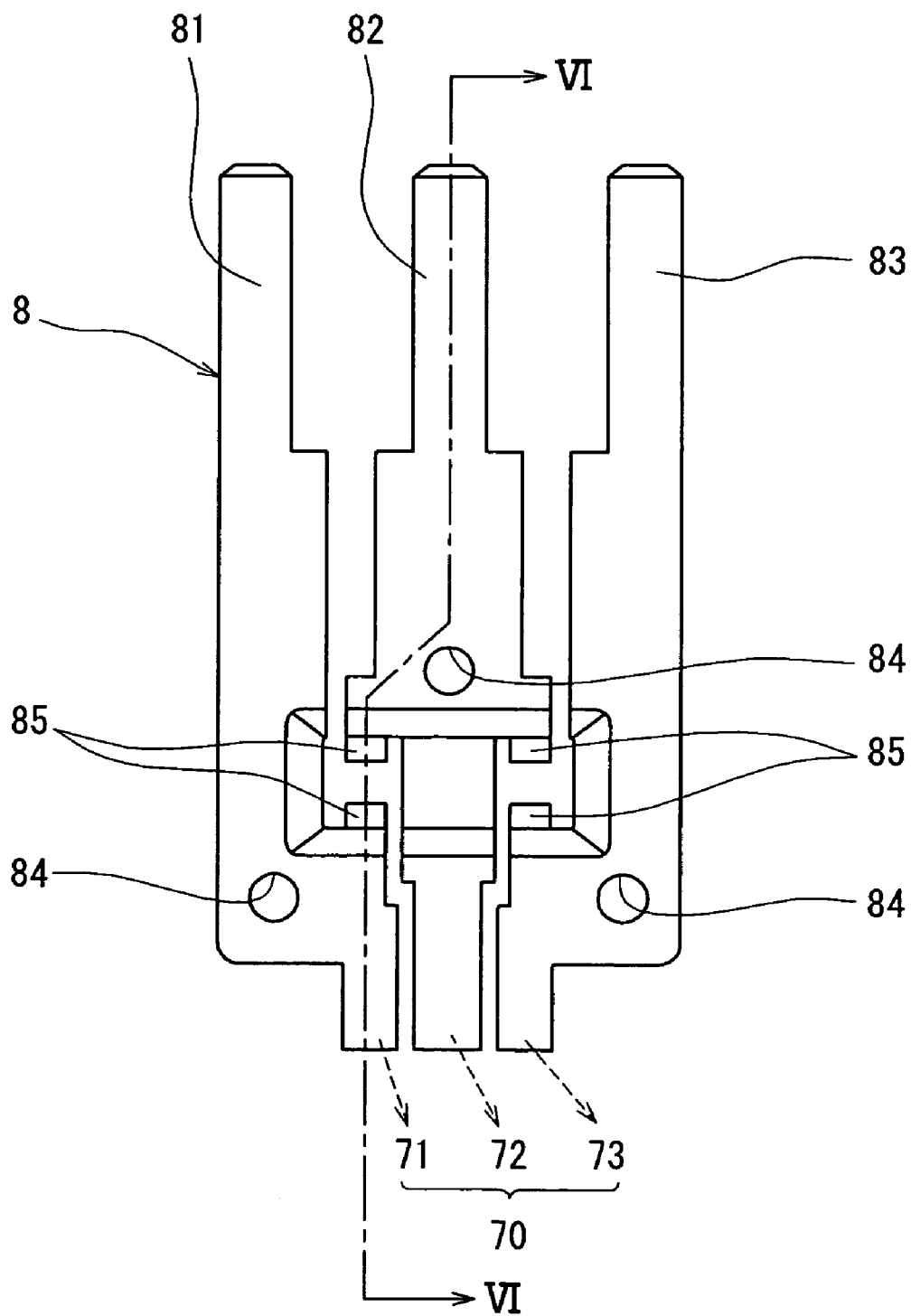
FIG. 5 is an enlarged view of a terminal member shown in FIG. 2 viewed from direction indicated by arrow V.

The terminal member 8 is made of a conductive metal and has a signal terminal 81, a ground terminal 82, a power terminal 83, a pair of fixing holes 84 and two pairs of chip mounts 85, as shown in FIG. 5. The terminals 81, 82, 83 are respectively connected to the three leads 71-73 of the hall IC 70. The signal terminal 81 is connected with the signal lead 71, the ground terminal 82 is connected with the ground lead 72 and the power terminal 83 is connected with the power lead 83. Such connection is made by means of welding, soldering or mechanical clamping. The other end of terminal member 8 projects from the body 5 to be connected with the outside control circuit 21 shown in FIG. 9 at the other end via a connector (not shown) and a wire harness (not shown).

The power terminal 83 receives electric power to drive the hall element and the amplifying circuit. The signal terminal 81 transmits the hall voltage signal to the control circuit 21. That is, a driving voltage is applied to the hall element via the power terminal 83 and the power lead 73 thereby generating a hall voltage signal if a magnetic field is formed around the hall element. The hall voltage signal is amplified by the amplifying circuit, which is driven by power supplied thereto via the power terminal 83 and the power lead 73, and sent to the control circuit 21 via the signal terminal 81 and the signal lead 71.

The magnetic flux density of the magnetic flux passing through the hall element of the hall IC 70 changes as the fuel level A1 changes and the rotary member 4 rotates. Therefore, the hall voltage signal changes, and the output signal of the hall IC 70 changes. Then, the level A1 of the fuel is calculated from the output signal of the hall IC 70.

As shown in FIG. 5, the first pair of chip mounts 85 projects in parallel with the terminals 81, 82, 83 into a space formed between the ground terminal 82 and the signal terminal 81, and the second pair of chip mounts projects in parallel with the terminals 81, 82, 83 into a space formed between the ground terminal 82 and the power terminal 83.

Figure 6:
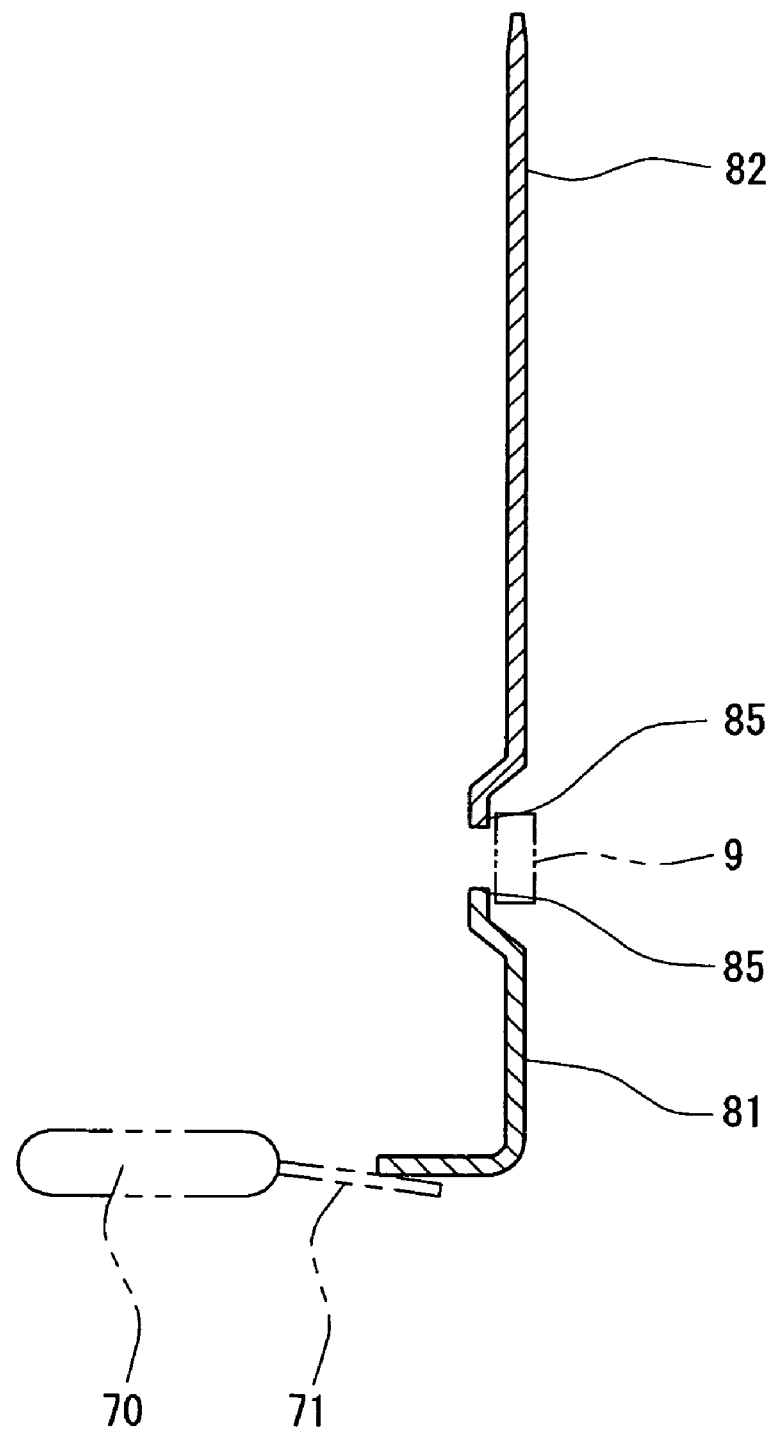
FIG. 6 is a cross-sectional view of the terminal shown in FIG. 5 cut along line VI-VI.

As shown in FIGS. 6 and 7, a portion of the terminal member 8 is dented to form the mounts 85, onto which epoxy resin is applied to form a protecting cover 91 in order to protect the chip capacitors 9 and solder 92 from heat of molding. The detecting unit 7 is formed when the terminal member 8, the hall IC 70 and the chip capacitors 9 are connected each other, and the chip holder 10 is fixed thereto. The chip holder 10 is fixed to the terminal member 8 to hold the chip capacitors 9. The chip holder 10 is made of a heat resistive material such as polyphenylene sulfide (PPS) and has a chip holding portion 11, a base portion 12 and a sheath portion 13.

After the hall IC 70 is soldered to the terminal member 8, the chip holder 10 is fixed to the terminal member 8 at the fixing holes 84 by means of thermal adhesion or press-fitting. Thereafter, the chip capacitors 9 are soldered to the chip mounts 85 so that the chip capacitors 9 can be held by the chip holder 10.

Figure 8:
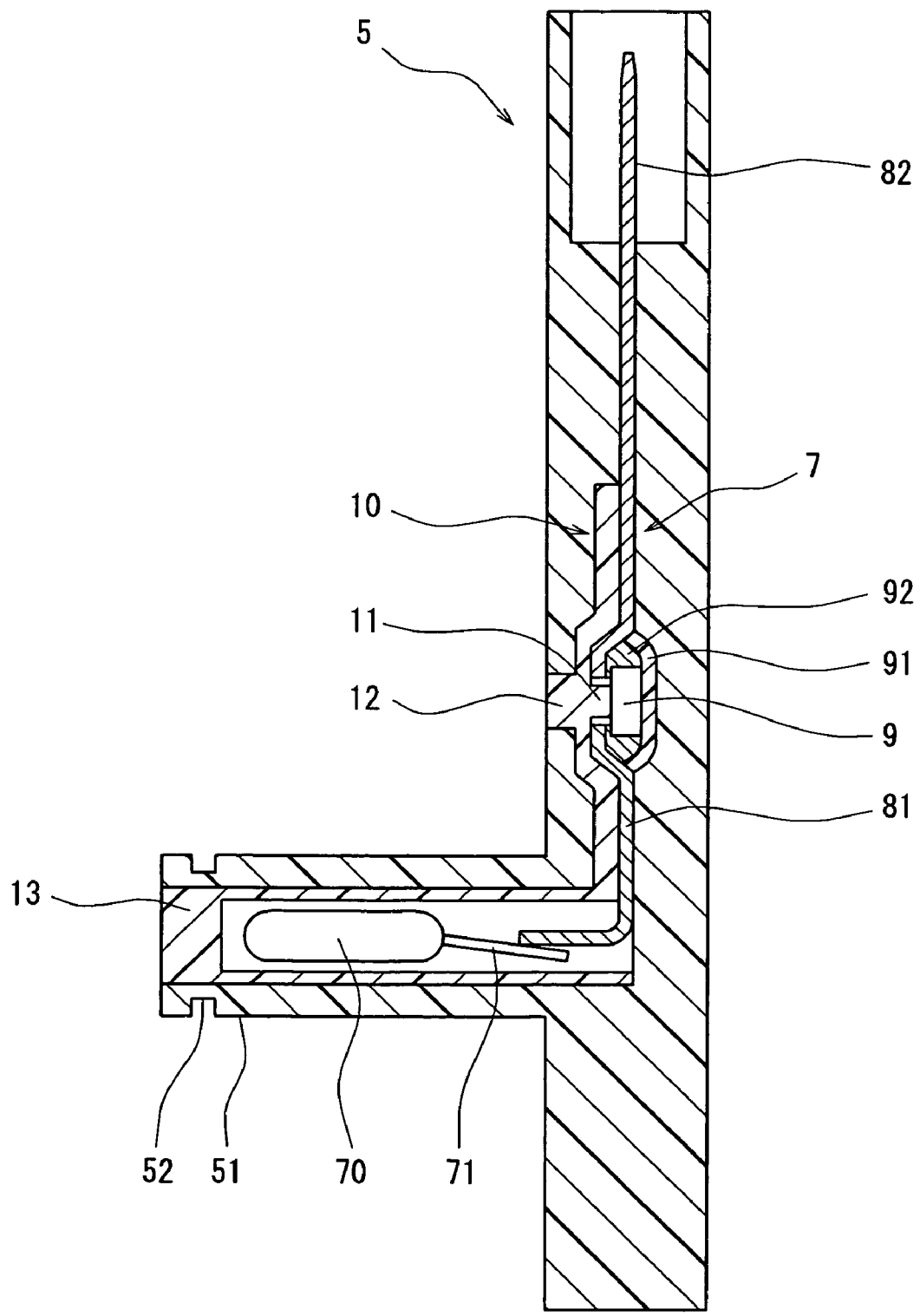
FIG. 8 is a cross-sectional longitudinal view of a body shown in FIG. 2.

As shown in FIG. 8, the detecting unit 7 is insert-molded with resinous material to form the body 5. In the meantime, the chip holder 10 is supported by a molding die at the base portion 12 thereof, so that the chip capacitors 9 can be held by the chip holding portion 11 of the chip holder 10. Because the chip capacitors 9 are held by the chip holding portion 11, the chip capacitors 9 are prevented from being damaged by a high molding pressure during the insert-molding. The terminal member 8 is also supported by the chip holder 10 against the molding pressure. Therefore, the terminal member 8 is prevented from bending or deforming, so that the chip capacitors 9 can be protected from mechanical stresses. Further, the hall IC 70 is protected from molding heat by the sheath portion 13.

Then, the shaft 51 is inserted into the cylindrical inner wall 41 of the rotary member 4, and the circlip 53 is fitted to the ring-shaped groove 52. Subsequently, the arm 3 is inserted into the through hole 43 so that the arm 3 can rotate about the through hole 43. Thereafter, the arm 3 is press-fitted to the inside of the holder members 42 from left in FIG. 3. The holder members 42 elastically deform to tightly hold the arm 3.

Figure 10:
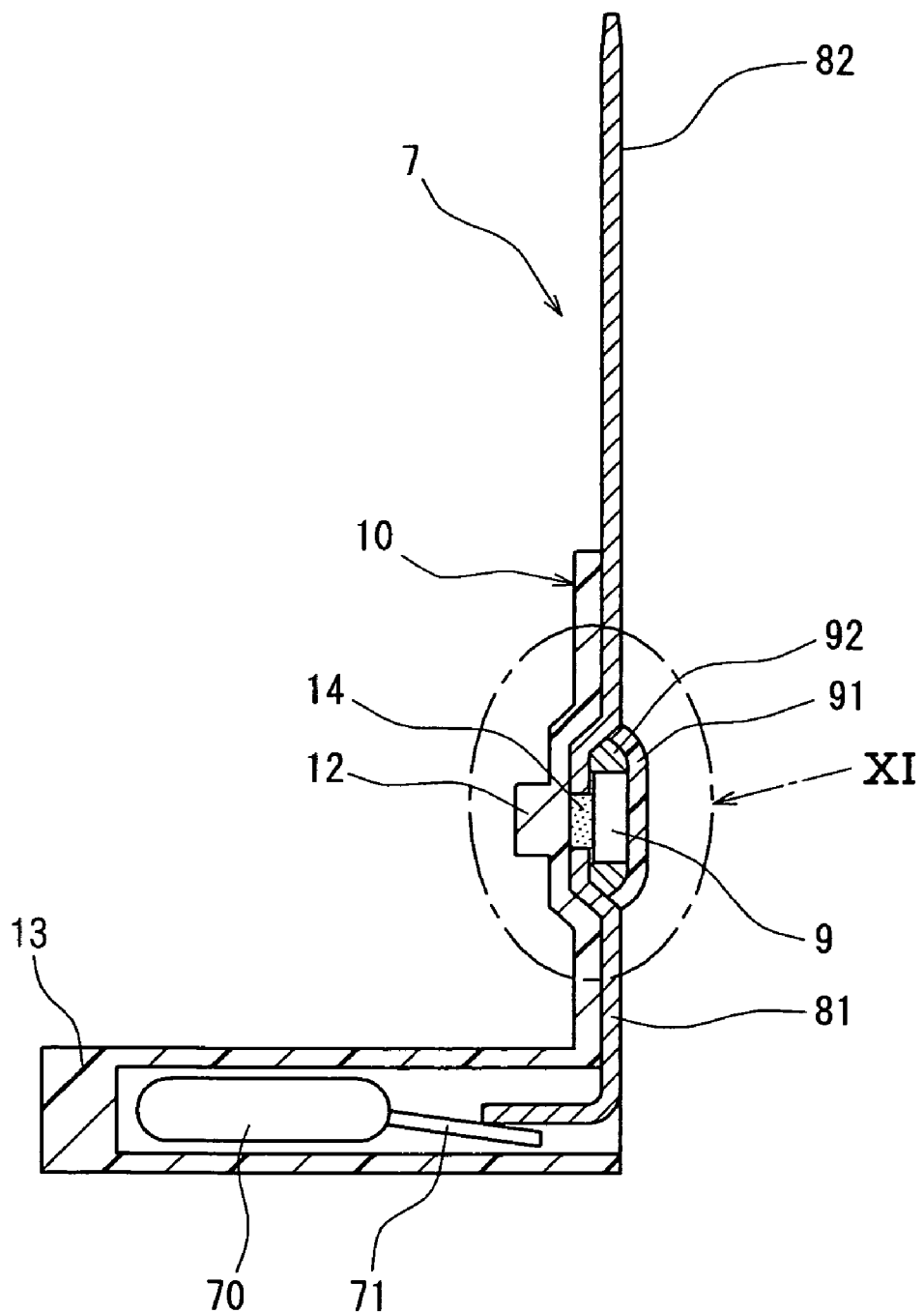
FIG. 10 illustrates a variation of the detecting unit shown in FIG. 7.
Figure 11:
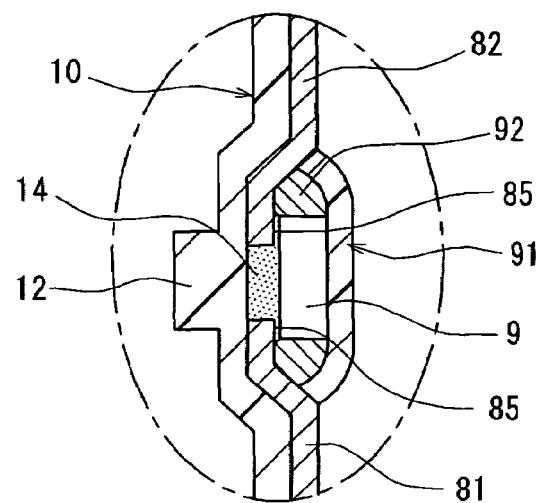
FIG. 11 is an enlarged view of a portion of the detecting unit shown in FIG. 10 encircled by a one-dot chain line that is indicated by arrow XI.

As shown in FIGS. 9-11, the fuel level gauge 1 includes a pair of chip capacitors 9 soldered to the mounts 85 of the terminal member 8 to electrically connect the terminals 81-83, thereby electrically protecting the hall IC 70. Each chip capacitor 9 is a multilayer capacitor that has a capacitor of such as 4.7 nF. One of the chip capacitors 9 has a pair of leads soldered to the first pair of chip mounts 85 that respectively project from the ground terminal 82 and the signal terminal 81. The other chip capacitor 9 has a pair of leads soldered to the second pair of the chip mounts that respectively project from the ground terminal 82 and the power terminal 83. In other words, the signal terminal 81 and the power terminal 83 are respectively connected to the ground via the chip capacitors 9.

If a high voltage noise signal is applied to the signal terminal 81 or the power terminal 83, the noise signal is bypassed through the chip capacitors 9 to the ground terminal 82 without badly affecting the hall IC 70. Therefore, the hall IC 70 is not damaged by the high voltage noise. Because the chip capacitor is much smaller than the common capacitor, the size of the fuel level gauge 1 can be made compact.

As shown in FIG. 9, a combination meter 20 includes the control circuit 21 and a fuel meter 22. The control circuit 21, which includes a microcomputer, is connected to a battery 24 via an ignition switch 23 and to the fuel meter 22.

When the ignition switch 23 is turned on, the control circuit 21 starts its operation. The control circuit 21 supplies electric power to the fuel level gauge 1 via the terminal 83 to operate the hall IC 70. The hall IC 70 sends the control circuit 21 a detection signal that corresponds to the fuel level A1 via the signal terminal 81 to drive the fuel meter 22.

If a high voltage noise is applied to the signal terminal 81 or the power terminal 83, the high voltage noise is discharged to the ground terminal 83 via the chip capacitors 9. Accordingly, the high voltage noise is not applied to the hall IC 70 or an amplifier.

Because the hall IC 70, the terminal member 8 and the chip capacitors 9, which form the detecting unit 7, are molded with resinous material when the body 5 is formed, the fuel level gauge 1 has a high vibration proof and a high resistance to temperature change during its operation.

A variation of the detecting unit 7 according to the first embodiment of the invention is shown in FIGS. 10 and 11.

An adhesive agent 14 is filled in the space between the chip capacitor 9 and the chip holder 10 instead of the chip holding portion 11.

After the hall IC 70 is soldered to the terminal member 8, the chip holder 10 is fixed to the terminal member 8. Thereafter, epoxy resin or the like is applied to the chip holder 10 from right in FIG. 10, and the chip capacitors 9 are mounted on the chip holder 10 so that the adhesive agent 14 can be sandwiched between the chip holder 10 and the chip capacitors 9. Subsequently, the chip capacitors 9 are soldered to the chip mounts 85 of the terminals 81-83. Since the chip capacitors 9 are held by the chip holder 10 via the adhesive agent, the chip capacitors 9 can be protected from outside mechanical stress.

Thereafter, epoxy resin is applied over the chip capacitors 9 and hardened to form the protecting cover 91.

The adhesive agent 14 also fills gaps between the chip capacitors 9 and terminal 8 and bonds them. Therefore, the chip capacitors 9 are also supported by the terminal member 8.

The adhesive agent can be applied to gaps between the chip capacitors 9 and the chip holder 10 even if the chip holding portion 11 remains.

Figure 12:
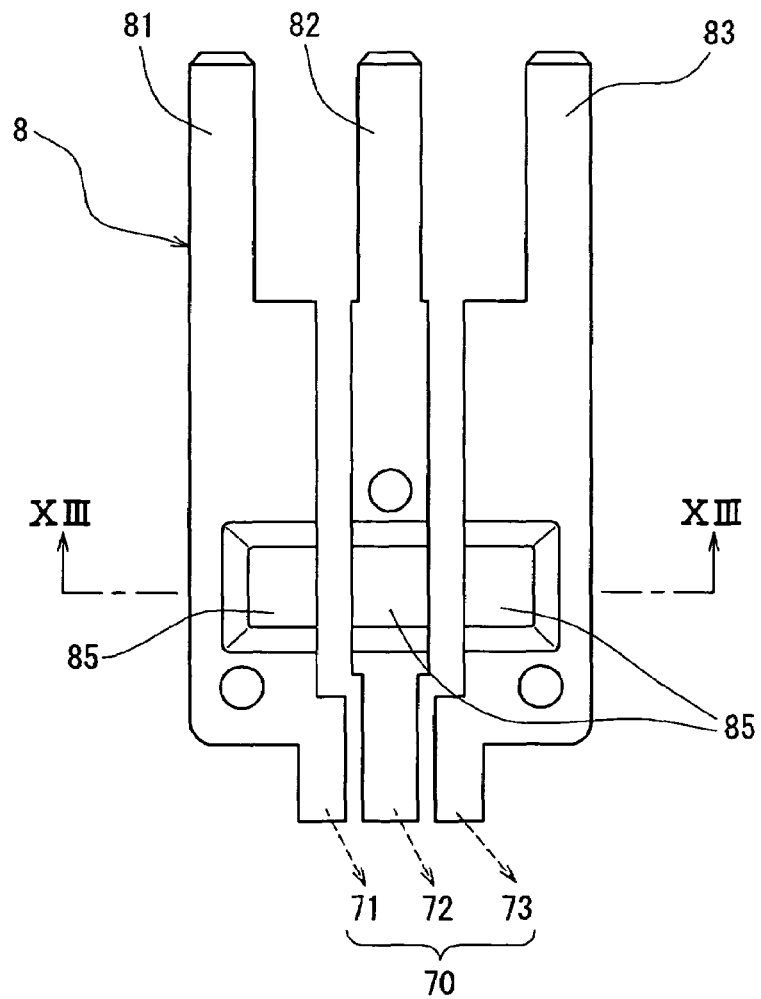
FIG. 12 illustrates a variation of the terminal shown in FIG. 5.
Figure 13:
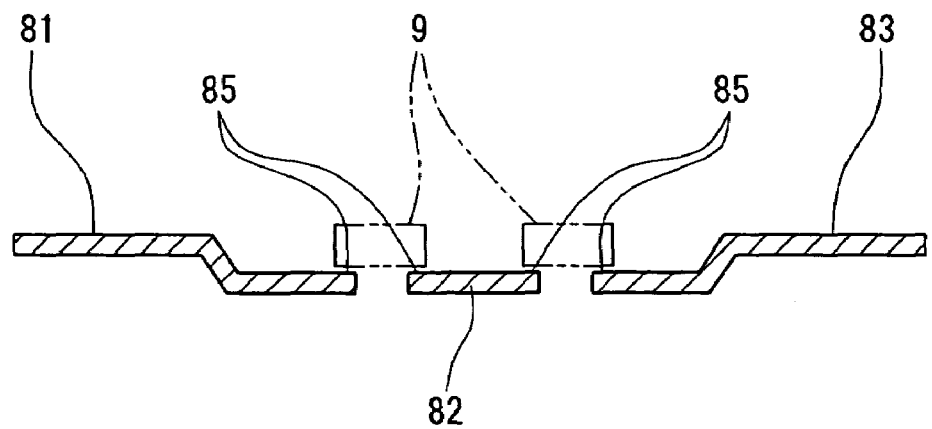
FIG. 13 is a cross-sectional view of the terminal shown in FIG. 12 cut along line XIII-XIII.
Figure 14:
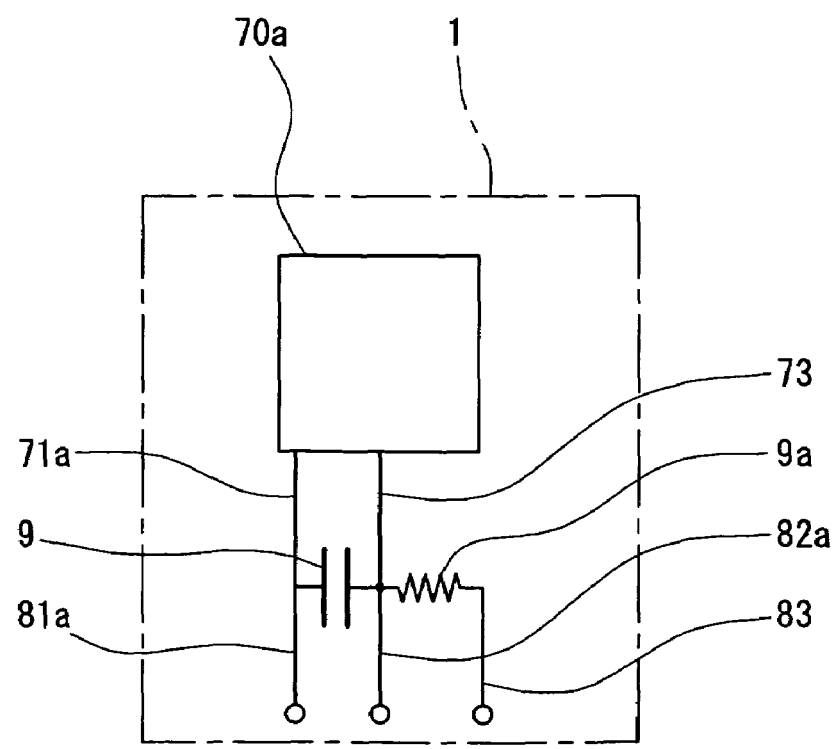
FIG. 14 is a circuit diagram of a variation of the fuel level gauge shown in FIG. 9.

A variation of the terminal member 8 is shown in FIGS. 12 and 13. Three chip mounts 85 are formed respectively on the signal terminal 81, the ground terminal 82 and the signal terminal 83. The chip terminals 85 are formed on the same level as shown in FIG. 13. One of the chip capacitors 9 is soldered to the chip mounts 85 formed on the signal terminal 81 and the ground terminal 82, and the other chip capacitor 9 is soldered to the chip mounts formed on the ground terminal 82 and the power terminal 83.

A variation of the fuel level gauge 1 has a hall IC 70a that has a pair of leads 71a and 73 and a terminal member that has a joint terminal 81a, a adjusting terminal 82a and the power terminal. The lead 71a functions as the signal lead 71 and the ground lead 72, and the joint terminal 81a functions as the signal terminal 81 and the ground terminal 82. The adjusting terminal 82a adjusts the output signal of the hall IC 70a that indicates fuel level A1 of the fuel A. The fuel level gauge 70a also includes a chip capacitor 9 and a chip resistor 9a. The chip resistor 9a has a resistance of about 30 ohms to limit current flowing into the hall IC 70a. The terminal member 8 and the chip holder 10 may be fixed together by means of outsert-molding.

Figure 15:
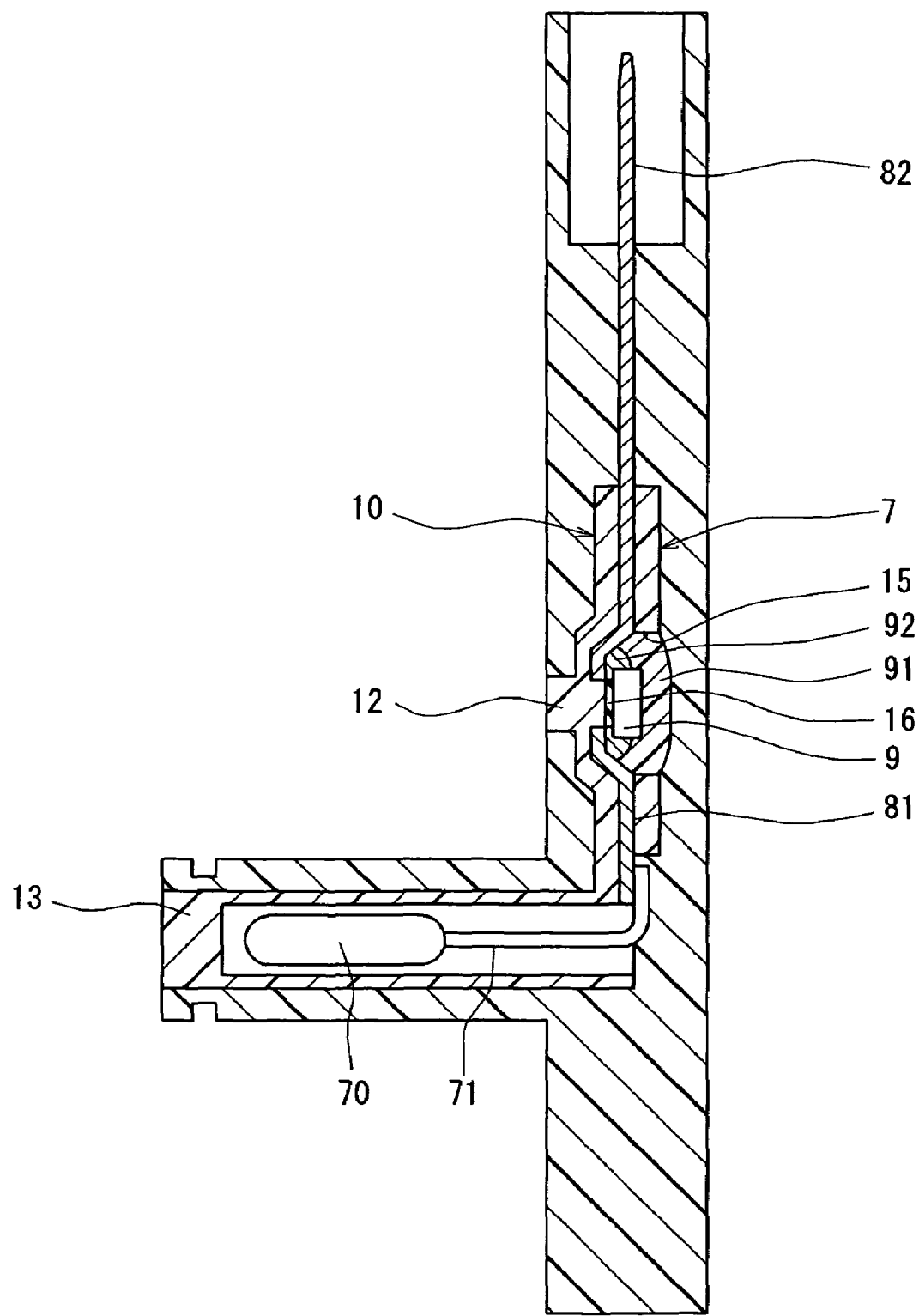
FIG. 15 illustrates a variation of the fuel level gauge shown in FIG. 9.
Figure 16:
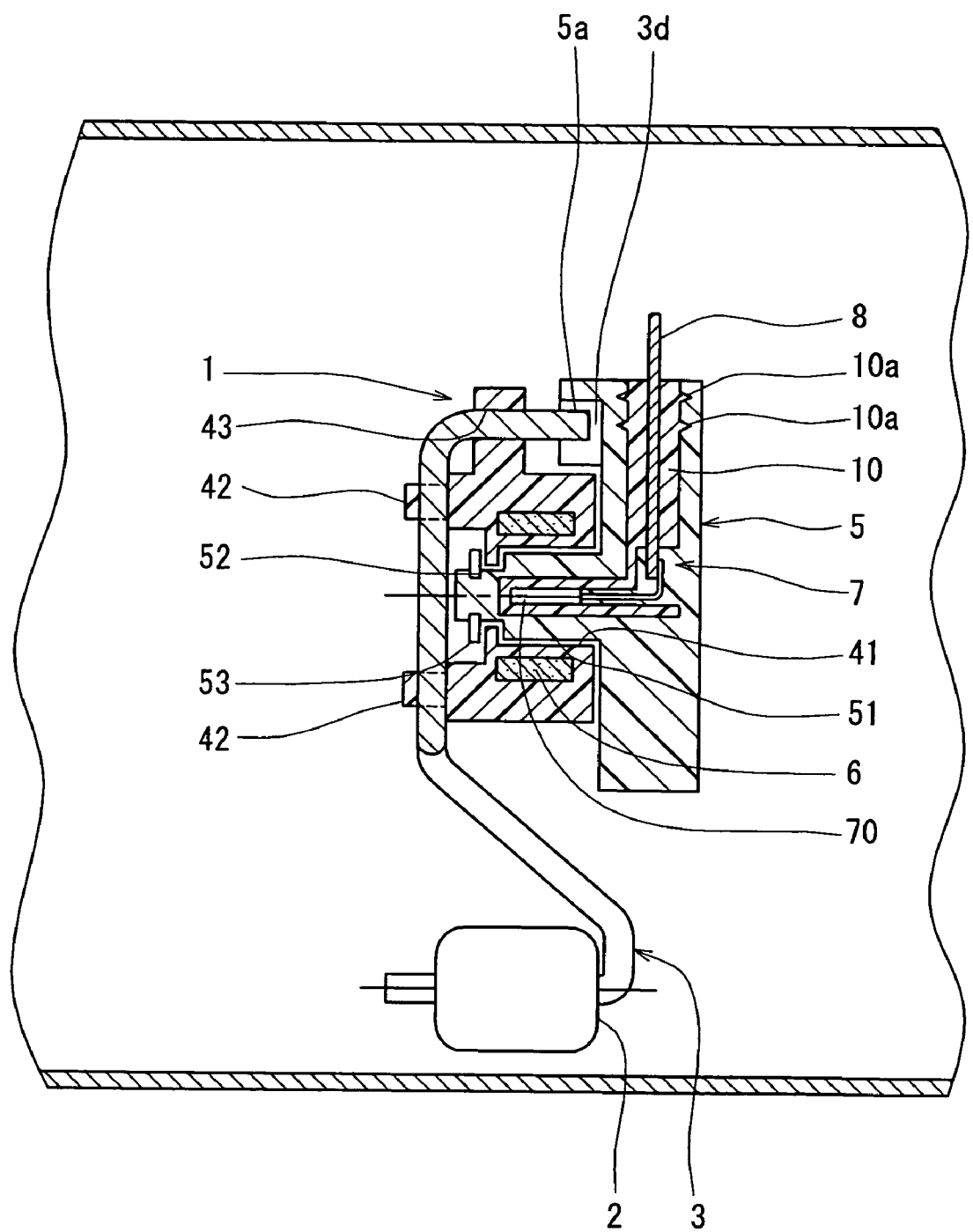
FIG. 16 is a cross-sectional view of a liquid level detecting device according to the second embodiment of the invention.
Figure 17:
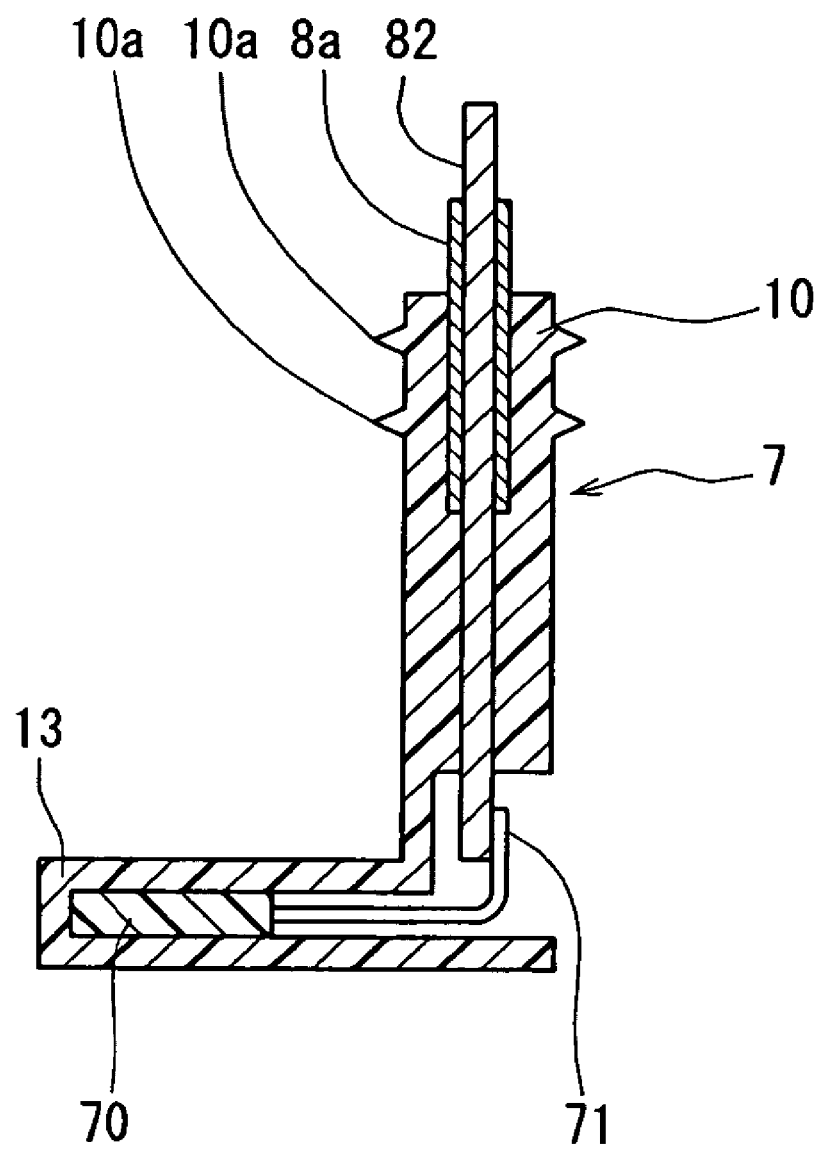
FIG. 17 is a cross-sectional longitudinal view of a detecting unit.

Another variation of the fuel level gauge 1 is described with reference to FIG. 15.

The terminal member 8 that includes the terminals 81, 82, 83 and the chip holder 10 are insert-molded into the detecting unit 7 in substantially the same way described previously. An adhesive agent 16 is filled between the chip holder 10 and the chip capacitor 9. The adhesive agent 16 is firstly put on the bottom surface of the chip capacitor 9 and brought into the dented portion 15 of the chip holder 10 to be temporally fixed thereto. Subsequently, the chip capacitor 9 is soldered to the terminals 81 and 82. The adhesive agent 16 temporally holds the chip capacitor 9 until it is soldered to the terminals 81, 82 and eliminates air gaps otherwise forming between the chip capacitor 9 and the chip holder 10. Thus, the chip capacitor 9 is protected from molding pressure during the insert-molding.

The chip resistor 9a is also soldered to the terminals 82, 83 in the same manner as the chip capacitor 9. The chip holder 10 has two base portions 12 to support the chip capacitor 9 and the chip resistor 9a against the molding pressure, which are the same in structure as that shown in FIG. 7. However, the two base portions 12 can be formed into one.

After the chip capacitor 9 and the chip resistor 9a are soldered to the terminal member 8, resinous material is filled into the dented portion 15 to form the protecting cover 91. The protecting cover 91 protects the chip capacitor 9 and the chip resistor 9a from the molding pressure and molding temperature when the detecting unit 7 is molded into the body 5. The dented portion 15 also prevents a melted portion of the protecting cover 15 from flowing out right after the protecting cover 15 is formed.

A fuel level gauge 1 according to the second embodiment of the invention will be described with reference to FIGS. 16-20. Incidentally, the same reference numeral will indicate the same or substantially the same part, portion or component as the first embodiment.

The fuel level gauge 1 includes a float 2, an arm 3, a rotary member 4, a body 5, a permanent magnet 6, a detecting unit 7, which is comprised of a hall IC 70, a terminal member 8 that connects the hall IC 70 with an outside unit and a resinous chip holder 10. The chip holder 10 has a sheath portion 13 that holds the hall IC 70 inside thereof. The cross section of the inside space of the sheath portion 13 is approximately the same as the cross section of the hall IC 70 to tightly hold the same.

The terminal member 8, which has three terminals 81-83, is covered with an adhesive coating 8a by means of organic plating at portions thereof in contact with the chip holder 10.

The chip holder 10 has a pair of parallelly formed ring-shaped projections 10a, each of which has a triangular cross-section, at the upper portion thereof.

In manufacturing, the adhesive coating 8a is coated on the terminal member 8 at first. The adhesive coating 8a is a coating disclosed in JP-A-2001-1445, for example. Then, the terminal member 8 is insert-molded into the chip holder 10. In the meanwhile, the adhesive coating 8a is chemically bonded to the resinous material of the chip holder 10 to form a diffusion zone, so that the terminal member 8 is tightly held by the chip holder 10. Thereafter, the hall IC 70 is inserted into the sheath 13 of the chip holder 10. Subsequently, the leads 71-73 of the hall IC 70 are connected with the terminals 81-83 of the terminal member 8 by means of fusing or clamping, so that the detecting unit 7 is formed.

The detecting unit 7 is set in a molding die for forming the body 5, which has a filling gate above the body 5. Therefore, liquid resinous material of a high temperature flows along the pair of ring-shaped projections 10a after it is injected into the die until the molding is completed. Accordingly, the upper portion of detecting unit 7 is exposed to the high temperature for a long time period, so that the resinous material is completely bonded to the detecting unit 7 when the body 5 is formed.

Because the hall IC 70 is accommodated in the sheath 13, it is insulated from heat of a high temperature while the detecting unit 7 is molded into the body 5. Because of the adhesive coating 8a and the ring-shaped projection 10a, the hall IC 70 is kept from fuel even when the fuel level gauge 1 is immersed in the fuel A. Incidentally, the number of the ring-shaped projections may be changed to three or more.

Figure 18:
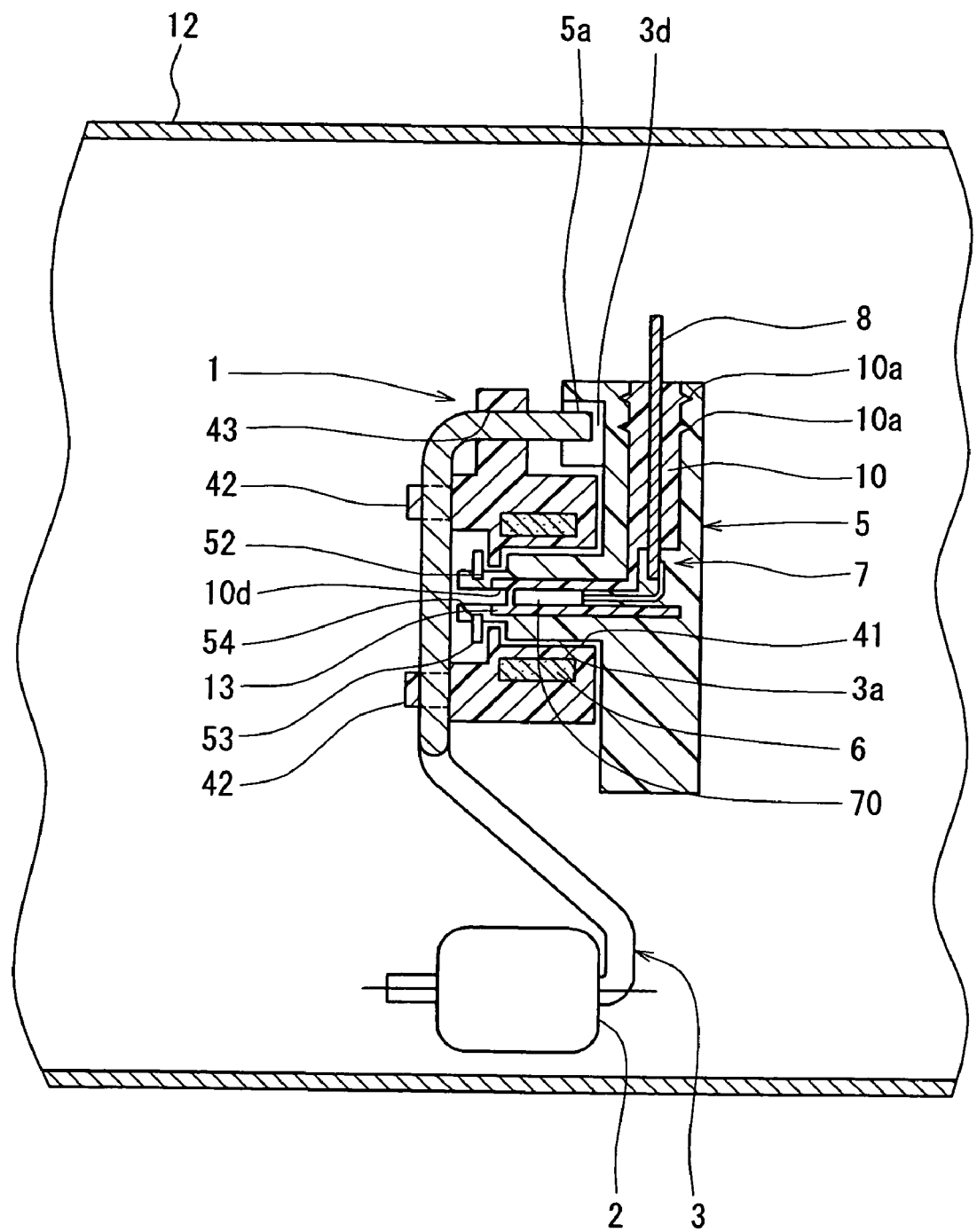
FIG. 18 illustrates a variation of the liquid level detecting device according to the second embodiment.

A variation of the fuel level gauge 1 according to the second embodiment of the invention will be described with reference to FIGS. 18 and 19.

The chip holder 10 has a cylindrical dented portion 10d at the other side of the bottom of the sheath portion 13 where the hall IC 70 is accommodated.

Figure 19:
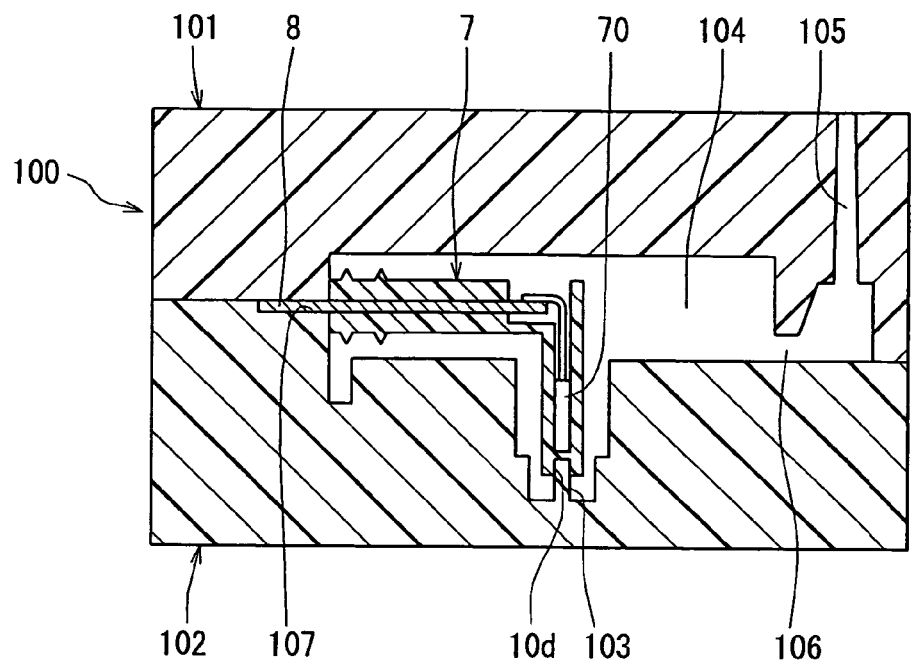
FIG. 19 illustrates a molding die for manufacturing the variation of the liquid level detecting device according to the second embodiment.

When the detecting unit 7 is set in a molding die 100, which is comprised of an upper die and a lower die 102, 102, the dented portion 10d is supported by a positioning pin 103 projects from the die 102, as shown in FIG. 19. Accordingly, the detecting unit 7 can be molded into the body at a high precision. Reference numeral 54 indicates a hole of the body 5 through which the positioning pin 103 extends while the body 5 is being molded.

The terminal member 8 is placed in grooves 107 (e.g. three grooves for terminals 81, 82, 83) formed between the upper die 101 and the lower die 102.

A preset amount of hot liquid of resinous material is injected through a sprue 105 and a gate 106 into a cavity 104 until the resinous material fills the cavity 104 completely. Then, the resinous material in the cavity 104 gradually cools down and hardens. When the resinous material has hardened sufficiently, the upper and lower dies 101, 102 are separated to unload the body 5 from the die 100.

Figure 20:
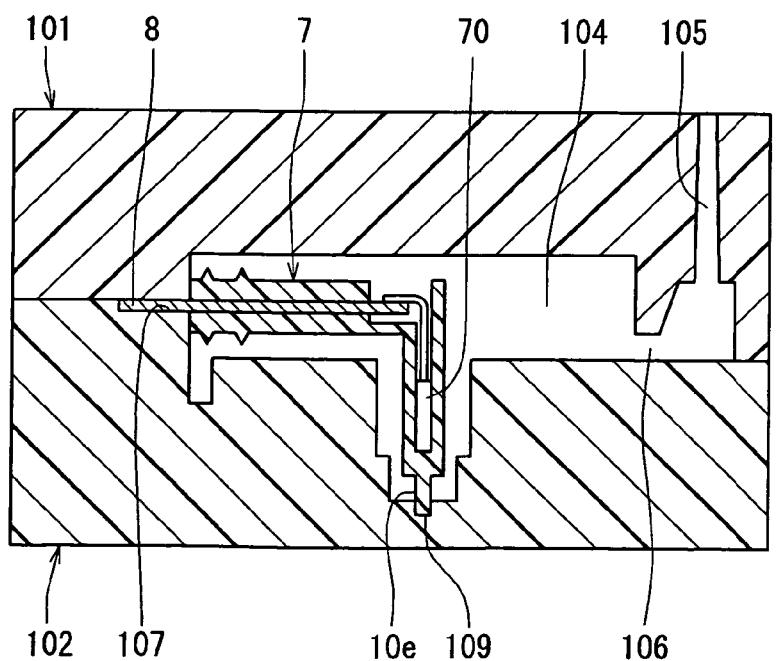
FIG. 20 illustrates a molding die for manufacturing another variation of the liquid level detecting device according to the second embodiment.

As shown in FIG. 20, the chip holder 10 can have a projection 10e instead of the dented portion 10d, which is to be inserted into a positioning hole 109 formed in the lower die 102 instead of the positioning pin 103.

In the liquid level detecting device described above, the hall IC 70 may be replaced by other detecting unit such as a unit including a MRE (magnetoresistance element) or a magnetodiode.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A liquid level detecting device for detecting liquid level contained in a tank comprising:
   a first member moving in a prescribed manner when liquid level changes;
   field means for forming a magnetic field;
   an electronic circuit for generating an electric signal in response to motion of the magnetic field;
   a second member linked with said first member and said field means for moving the magnetic field relative to said electronic circuit as said first member moves;
   a terminal member for connecting said electronic circuit to an outside control circuit; and
   a resinous mold body for at least partly encasing and holding said electronic circuit and said terminal member with resinous material, wherein a holder is disposed in said resinous material to hold and insulate said electronic circuit from heat and mechanical stress when said mold body is formed,
   wherein said holder includes a sheath that holds said electronic circuit.

2. A liquid level detecting device as claimed in claim 1, wherein said first member comprises a float disposed in liquid and an arm that links said float with said second member.

3. A liquid level detecting device as claimed in claim 2, wherein:
   said field means comprises a permanent magnet;
   said second member comprises a rotary member that carries said permanent magnet; and
   said mold body includes a hollow shaft for rotatably supporting said rotary member at its outer periphery and accommodating at least a portion of said holder inside thereof.

4. A liquid level detecting device as claimed in claim 1, wherein said electronic circuit comprises a hall IC.

5. A liquid level detecting device as claimed in claim 1, wherein said electronic circuit further comprises a chip capacitor connected to said terminal member to protect said electronic circuit from electric noises.

6. A liquid level detecting device as claimed in claim 5, wherein:
   said terminal member comprises at least a first terminal, a second terminal and a pair of chip mounts for mounting said chip capacitor to be connected across said first terminal and said second terminal.

7. A liquid level detecting device as claimed in claim 5, wherein said terminal member and said chip capacitor and said electronic circuit are integrated into said holder to form a detecting unit that is covered with resinous material to form said mold body.

8. A liquid level detecting device as claimed in claim 7, wherein said detecting unit comprises a protecting cover that covers said chip capacitor.

9. A liquid level detecting device as claimed in claim 8, wherein said holder has a dented portion in which said chip capacitor is disposed and fixed to said terminal member.

10. A liquid level detecting device as claimed in claim 5, wherein said holder has a base portion for protecting said terminal member from molding pressure when said mold body is formed in a molding die.

11. A liquid level detecting device as claimed in claim 10, further comprising an adhesive agent disposed between said resinous holder and said chip capacitor.

12. A liquid level detecting device as claimed in claim 9, further comprising a resinous material filled in said dented portion.

13. A liquid level detecting device as claimed in claim 1, wherein said holder is a resinous holder, and said sheath extends perpendicular to said terminal member to hold said electronic circuit.

14. A liquid level detecting device as claimed in claim 1, wherein:
   said terminal member has an adhesive coating at a portion in contact with said holder; and
   said holder has a ring-shaped projection at a portion thereof surrounding said terminal member.

15. A liquid level detecting device as claimed in claim 13, wherein said resinous holder has a dented portion at a side of said sheath behind said electronic circuit to be supported by a pin projecting from a die when said detecting unit is molded into said mold body by a molding die.

16. A liquid level detecting device as claimed in claim 13, wherein said resinous holder has a projecting portion from a side of said sheath behind said electronic circuit to be supported by a molding die when said detecting unit is molded into said mold body by the molding die.

17. A method of manufacturing liquid level detecting device that includes a first member moving in a prescribed manner when liquid level changes, field means for forming a magnetic field, an electronic circuit for generating an electric signal in response to motion of the magnetic field, a second member linked with said first member and said field means for moving the magnetic field relative to said electronic circuit as said first member moves, a terminal member for connecting said electronic circuit to an outside control circuit; and a mold body including a holder for holding said electronic circuit and said terminal member, wherein said holder including a case for insulating said electronic circuit from heat and mechanical stress when said mold body is formed, said method comprising the steps of:
   molding said terminal member with resinous material to form an integrated unit of said holder having said case and said terminal member;
   electrically connecting a chip element to said terminal member so that said chip element can be supported by said terminal member, thereby forming a detecting unit; and
   molding said detecting unit with resinous material to form said mold body.

18. A method as claimed in claim 17, further comprising a step of filling resinous material between said chip element and said holder before the step of molding said detecting unit.

19. A method as claimed in claim 17, wherein:
   said step of molding said terminal member further comprises a step of forming a dented portion for exposing said terminal member so as to connect said chip element to said terminal member.

20. A method as claimed in claim 17, wherein:
   said step of molding said terminal member further comprises a step of forming a base portion behind said dented portion so that said resinous holder can be supported by a mold die at said base portion in said step of molding said detecting unit.

21. A method as claimed in claim 17, further comprising a step of covering adhesive agent at a portion of said terminal member in contact with said holder before the step of molding said terminal member.

22. A method as claimed in claim 17, further comprising a step of inserting said electronic circuit into said case before the step of electrically connecting.

* * * * *